United States Patent [19]

Kubis et al.

[11] Patent Number: 5,010,853
[45] Date of Patent: Apr. 30, 1991

[54] CYLINDER HEAD SEALING ELEMENT FOR RECIPROCATING PISTON ENGINES

[75] Inventors: Heribert Kubis, Nuremberg; Josef Winter, Rednitzhembach, both of Fed. Rep. of Germany

[73] Assignee: MAN Nutzfahrzeuge Aktiengesellschaft, Nuremberg, Fed. Rep. of Germany

[21] Appl. No.: 552,181

[22] Filed: Jul. 12, 1990

[30] Foreign Application Priority Data

Jul. 12, 1989 [DE] Fed. Rep. of Germany ....... 3922885

[51] Int. Cl.$^5$ .............................................. F02F 1/10
[52] U.S. Cl. ......................... 123/41.84; 123/193 C H
[58] Field of Search ............... 123/41.72, 41.83, 41.84, 123/193 CH

[56] References Cited

U.S. PATENT DOCUMENTS 4,867,118  9/1989  Kubis et al. .................. 123/193 CH Primary Examiner—Noah P. Kamen
Attorney, Agent, or Firm—Robert W. Becker & Associates

[57] ABSTRACT

A cylinder head sealing element for reciprocating piston engines, especially internal combustion engines, and advantageously engines having cylinder liners, is provided. To solve the increasingly more difficult problem of sealing the cylinder head where the power density of internal combustion engines is increased, a ring-like sealing element is provided, the end faces of which plastically deform when the cylinder head screws are tightened. The inner deformations of the cylinder head resulting from pressure forces in the cylinder are compensated for by elastic yielding of the sealing ring of the combustion chamber. The dimensions of the rib of a collar of a cylinder liner, of the groove of the cylinder head, and of the end faces of the sealing ring are coordinated with one another in such a way that the plastic deformation of the sealing ring is not of such a magnitude that the cylinder liner can deform. The sealing ring can therefore be disposed directly in a centering means of the cylinder liner, thus eliminating the need for special centering devices.

6 Claims, 2 Drawing Sheets

1

CYLINDER HEAD SEALING ELEMENT FOR RECIPROCATING PISTON ENGINES

BACKGROUND OF THE INVENTION

The present invention relates to a cylinder head sealing element for a reciprocating piston engine, especially an internal combustion engine, and advantageously an engine having cylinder liners, whereby an end of a cylinder liner that faces the cylinder head is provided with a collar that has a centering means and also has an annular rib that is concentric to the cylinder liner, with the cylinder head, across from this rib, being provided with an annular groove that is concentric to the rib, and whereby when the cylinder head screws are tightened, the preferably metallic sealing element of constant thickness penetrates into the groove and is penetrated by the rib, accompanied by plastic deformation of the sealing element.

Applicant's U.S. Pat. No. 4,867,118, issued Sept. 19, 1989, discloses a cylinder head sealing arrangement for wet cylinder liners, with a metallic sealing element of constant thickness being disposed between a collar of the cylinder liner and a cylinder head. The collar has a raised, annular rib, and the cylinder head has a groove that is disposed across from this rib and is concentric thereto. When the cylinder head screws are tightened, the rib penetrates into the sealing element, and the sealing element in turn penetrates into the groove, accompanied by plastic deformation of the sealing element. To center the sealing element on the collar of the cylinder liner, a groove is provided in the sealing element facing the raised rib of the cylinder liner. Unfortunately, such a sealing element is too expensive due to the increased cost for manufacturing the groove in the sealing element.

It is therefore an object of the present invention to improve a sealing element of the aforementioned general type in such a way that the sealing element can be centered without additional manufacturing costs and without having to worry about an unacceptable effect upon the cylinder liner.

SUMMARY OF THE INVENTION

The cylinder head sealing element of the present invention, which serves for example to seal off a combustion chamber, is characterized primarily in that it is formed by a ring, with this ring resting against the centering means with a clearance fit, whereby the ring has a first end face that faces the rib of the collar and has a surface area with a value A1, the ring also having a second end face that faces the groove of the cylinder head and has a surface area, less an annular surface area of the groove, with a value A2, the ratio of A1 to A2 being $$\frac{A1}{A2} \approx \frac{3}{2},$$

and with the rib having an annular surface area with a value A3, the ratio of A3 to A2 being $$\frac{A3}{A2} \approx \frac{1}{2}.$$

Due to the precise coordination of the two end faces of the sealing element relative to the surfaces of the rib of the collar and the groove of the cylinder head, it is possible, despite plastic deformation in the region of the rib, to keep the change in diameter of the ring resulting from the deformation thereof so slight that no appreciable deformation in the region of the centering means of the cylinder liner has to be feared. In other words, it is merely necessary to provide between the sealing element and the centering means of the cylinder liner a minimum space in conformity with a clearance fit. In so doing, the sealing element can be centered precisely.

Pursuant to further advantageous specific embodiments of the present invention, a seal for the remainder of the surface can be disposed about the ring, with this seal preferably being made of sheet metal. The seal has holes through which are guided the cylinder head screws and also for accommodating sealing means that are formed of metal carriers onto which are vulcanized elastomeric overlays. The seal can be provided with annular gaps that form removal means for leakage gas. The height of the ring after plastic deformation is such that the ring can elastically follow the inner deformations of a cylinder head resulting from a pulsating ignition force.

As a result of these measures, not only is a seal against cooling medium and oil achieved, but also a discharge of combustion leakage gases into the cooling water circulation is avoided since the leakage gases are discharged into the atmosphere via annular gaps.

Further specific features of the present invention will be described in detail subsequently.

BRIEF DESCRIPTION OF THE DRAWINGS

This object, and other objects and advantageous of the present invention, will appear more clearly from the following specification in conjunction with the accompanying schematic drawings, in which.

DESCRIPTION OF PREFERRED EMBODIMENTS

Figure 1:
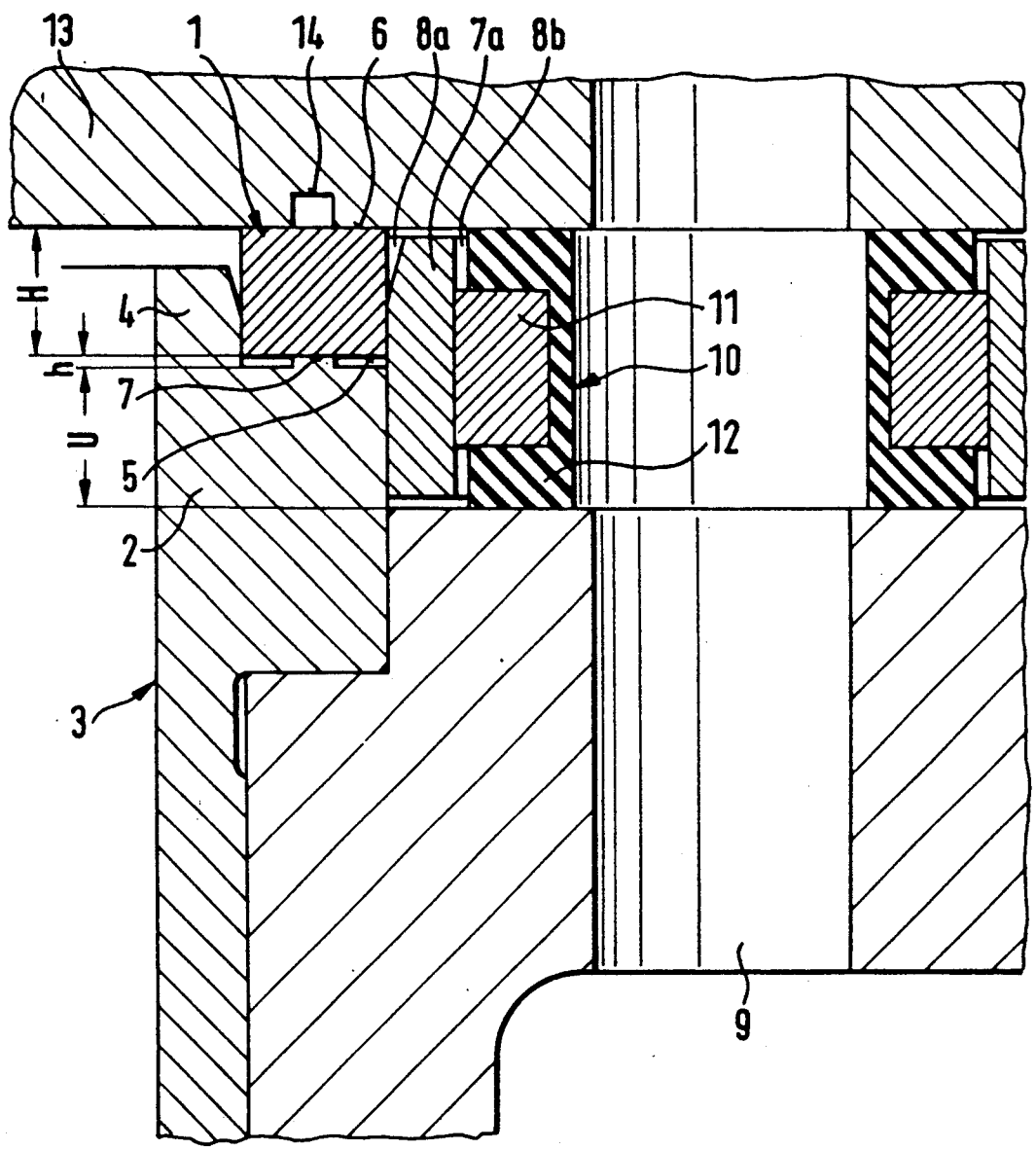
FIG. 1 is a partial cross-sectional view of one exemplary embodiment of the inventive cylinder head sealing element in an installed and nonstressed state.

Referring now to the drawings in detail, FIG. 1 shows a seal that is embodied as a ring 1. This ring 1 is placed in a collar 2 of a cylinder barrel or liner 3. To effect coaxial installation into the cylinder liner 3, a centering means or raised edge 4 is provided. The ring 1 has a first and a second end face 5 and 6 respectively, which are not machine, or which can be machined, for example by surface grinding or facing. In the nonstressed state, the height of the ring 1 is H. Since the ring 1 has a square or rectangular cross-sectional configuration, the height H can be produced with a low tolerance. The collar 2 is provided with an annular land or rib 7 having a height "h".

Disposed concentrically about the ring 1 is a seal 7a for the remainder of the surface, with the cylinder liner 3 extending over the base of the seal 7a by the amount U. The seal 7a is provided with annular gaps 8a and 8b for the removal of gas that might leak past the ring 1. Holes 9 for cylinder head screws extend through the seal 7a. To provide a seal from cooling water and oil, the holes 9 are surrounded by sealing means 10 that comprise a metal carrier 11 on which is vulcanized an elastomeric overlay 12. A machined contact surface of the cylinder head 13 is provided with an annular groove 14 that is disposed across from and concentric to the rib 7.

Pursuant to the present invention, a concrete ratio exists between the surface area of the rib 7, which has a value A3, and the second end face 6, which is reduced by the annular surface of the groove 14 and has the value A2, with this ratio being A3≃0.5 A2.

Figure 2:
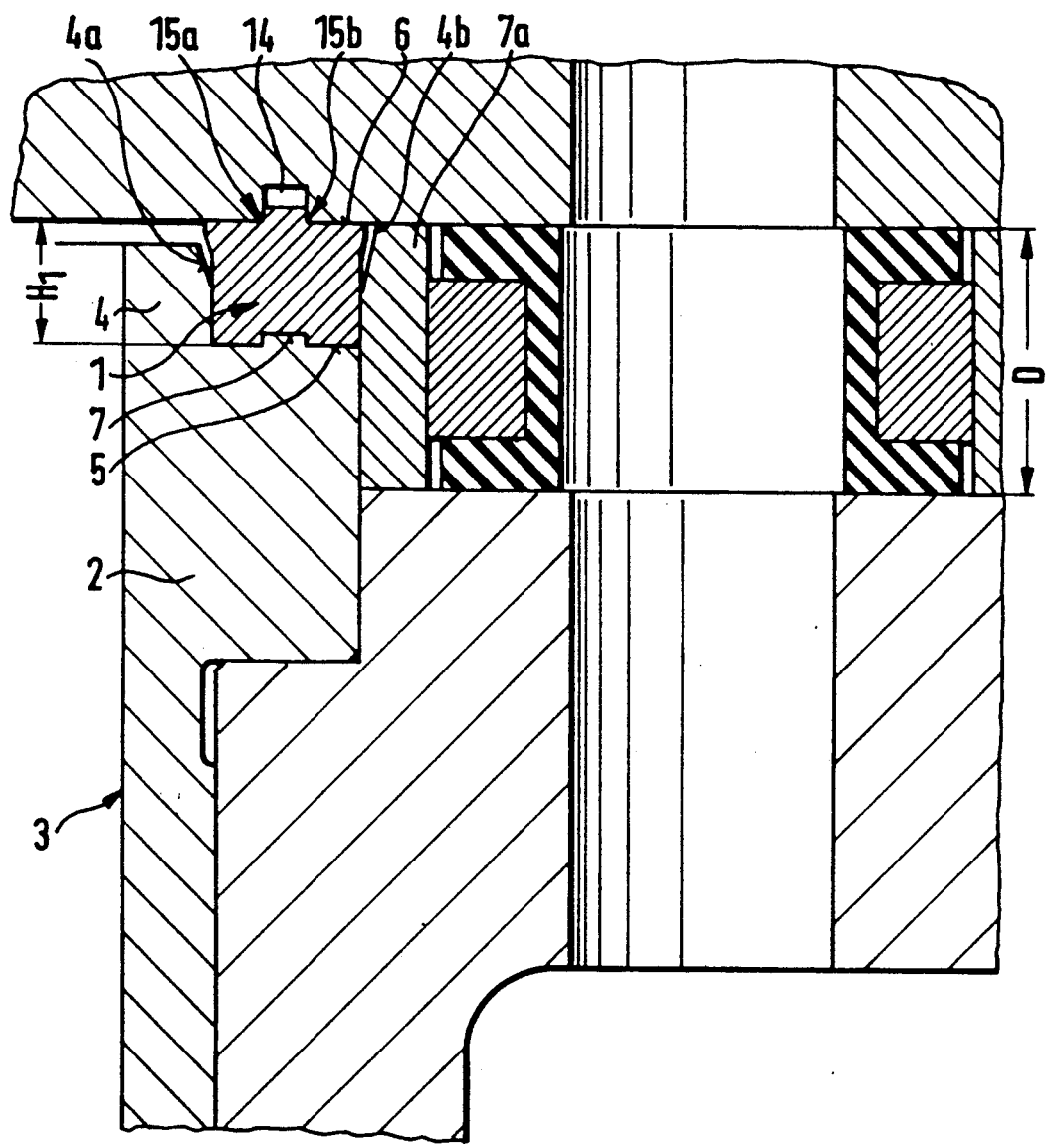
FIG. 2 shows the cylinder head sealing element of FIG. 1 in the installed state and under stress after the cylinder head screws have been tightened.

As shown in FIG. 2, when the non-illustrated cylinder head grooves are tightened, the rib 7 penetrates the ring 1, accompanied by plastic deformation of the ring. This plastic deformation is terminated when the first end face 5, less the surface area of the rib 7, comes to rest upon the collar 2.

After the entire surface of the ring 1 rests upon the collar 2 of the cylinder liner the ratio of the first end face 5, which has a value A1, to the reduced end face 6, which has a value A2, is $$\frac{A1}{A2} \simeq \frac{3}{2}.$$

If further yield or flow deformation of the ring 1 occurs due to tightening of the cylinder head screws, only that portion of the second end face or annular surface 6 that is adjacent the groove 14 is plastically deformed, as illustrated in FIG. 2. During this process, edges 15a and 15b of the groove 14 penetrate the second annular surface 6 until the plastic deformation is finally terminated as a result of the cylinder head 13 resting upon the remainder surface seal 7a. So as not to interfere with the deformation that occurs in this region, the centering means 4 and the seal 7a are provided with chamferred areas 4a and 4b respectively.

As a consequence of the inventive coordination of the surface areas A1, A2, and A3 with one another, the lateral deformation of the ring 1 in the region where it rests upon the collar 2 of the cylinder liner is so slight that upon installation of the ring 1, this ring can rest against the centering means with a clearance fit without having to worry about deformation of the cylinder liner 3 in the region of the centering means 4.

It is to be understood that centering of the ring 1 can be effected not only at the centering means 4, but also at an inner surface of the seal 7a, with the centering means of the seal 7a again being realized at the collar 2 of the cylinder liner 3 or via non-illustrated adapter elements.

As a consequence of the height $H_1$ of the ring 1 after the plastic deformation, along with the height D of the seal 7a and the amount U by which the cylinder liner 3 extends over this seal, the inventive sealing arrangement can elastically follow the inner deformation of the cylinder head 3 caused by the pulsating ignition force.

The present invention is, of course, in no way restricted to the specific disclosure of the specification and drawings, but also encompasses any modifications within the scope of the appended claims.

What we claim is:

1. In a cylinder head sealing element for a reciprocating piston engine, especially an internal combustion engine, and advantageously an engine having cylinder liners, whereby an end face of a cylinder liner that faces a cylinder head is provided with a collar that has a centering means and also has an annular rib that is concentric to said cylinder liner, with said cylinder head, across from said rib, being provided with an annular groove that is concentric to said rib, and whereby when cylinder head screws are tightened, said sealing element, which is disposed between said rib and said groove, penetrates into said groove and is penetrated by said rib, accompanied by plastic deformation of said sealing element, the improvement wherein:

said sealing element is formed by a ring, with said ring resting against said centering means with a clearance fit;

said ring has a first end face that faces said rib and has a surface area with a value A1;

said ring has a second end face that faces said groove and has a surface area, less an annular surface area of said groove, with a value A2;

the ratio of A1 to A2 is $$\frac{A1}{A2} \simeq \frac{3}{2};$$

said rib has an annular surface area with a value A3; and the ratio of A3 to A2 is $$\frac{A1}{A2} \simeq \frac{3}{2}.$$

2. A cylinder head sealing element according claim 1, in which said ring is made of metallic material and has a constant thickness in a nonstressed state.

3. A cylinder head sealing element according to claim 1, in which a seal for a remainder surface is concentrically disposed about said ring, with said seal being provided with holes through which cylinder head screws extend and which also accommodate sealing means formed from a metal carrier onto which is vulcanized an elastomeric overlay.

4. A cylinder head sealing element according to claim 3, in which said seal is made of sheet metal.

5. A cylinder head sealing element according to claim 3, in which said seal is provided with annular gaps that form removal means for leakage gas.

6. A cylinder head sealing element according to claim 3, in which said ring, after plastic deformation, has such a height that said ring can elastically follow inner deformations of said cylinder head resulting from a pulsating ignition force.

* * * * *